United States Patent [19]
Tanaka et al.

[11] 3,981,575
[45] Sept. 21, 1976

[54] PHOTOCOPIER ILLUMINATION DEVICE

[75] Inventors: Susumu Tanaka, Sakai; Yuji Enoguchi, Osaka; Masaya Ogawa, Sakai; Hidetoshi Kawabata, Tondabayashi; Takaji Kurita, Kawachinagano; Takao Fujiwara, Sakai; Hiroshi Murasaki, Sakai; Kenichi Wada, Sakai, all of Japan

[73] Assignee: Minolta Camera Kabushiki Kaisha, Osaka, Japan

[22] Filed: June 3, 1975

[21] Appl. No.: 583,391

[30] Foreign Application Priority Data
June 22, 1974 Japan.............................. 49-71518

[52] U.S. Cl.......................................... 355/1; 355/8; 355/11; 355/50; 355/67
[51] Int. Cl.².................. G03B 27/00; G03B 15/28; G03B 15/32
[58] Field of Search................. 355/1, 8, 11, 50, 51, 355/67, 69, 70

[56] References Cited
UNITED STATES PATENTS

| | | |
|---|---|---|
| 3,060,805 | 10/1962 | Brumley.............................. 355/1 X |
| 3,125,013 | 3/1964 | Herrick, Jr. et al. .................. 355/1 |
| 3,364,816 | 1/1968 | Jeffree ................................. 355/51 |
| 3,532,424 | 10/1970 | Miles ................................ 355/51 X |
| 3,659,935 | 5/1972 | Morow............................. 355/67 X |
| 3,694,076 | 9/1972 | Weber ................................. 355/50 |
| 3,777,135 | 12/1973 | Rees ............................... 355/70 X |
| 3,834,814 | 9/1974 | Wolff et al............................ 355/51 |

*Primary Examiner*—Richard A. Wintercorn
*Attorney, Agent, or Firm*—Wenderoth, Lind & Ponack

[57] ABSTRACT

An optical illumination device for use in a copying apparatus of the type wherein an object is to be illuminated and an image thereof is to be projected through a particular image transmitter formed of a plurality of optical fibers of graded refractive index in bundled configuration to a light sensitive surface, comprises a source of illumination light and a light guide duct of substantially flattened cubic body. The light guide duct is designed such that rays of light from the light source accommodated within the light guide duct are directed towards a curved reflective surface and subsequently converge at one point on the transparent support structure for the support of the original to be copied thereon to form a strip or ribbon of light available for illumination of the original to be copied.

25 Claims, 6 Drawing Figures

PHOTOCOPIER ILLUMINATION DEVICE

The present invention relates to an optical illuminating device for use in a copying apparatus for illuminating the original or document to be copied on a recording medium.

In most electrophotographic copying machines heretofore commercially available, an optical system employed therein generally includes an image transmitter in the form of a lens assembly composed of one or more lens elements. The use of the lens assembly has resulted in a requirement of an increased length of an optical path of travel of rays of light carrying an image of the original to be copied, which is, for example, in the case of real size reproduction of the original on the recording medium, about four times the focal length of the lens assembly employed. Accordingly, in order to reduce the overall size of the copying machine, the optical system employs two or more reflective mirrors disposed on the optical path of travel of the image within the machine housing for deflecting rays of light, which carry the image of the original, in a substantially zigzag manner towards a photoreceptor surface onto which said image is projected to form an electrostatic latent image thereon in a known manner.

Irrespective of the type of optical system employed, it is well reconginzed that a relatively large space is required for installation of the optical system within the machine housing and, therefore, reduction of the overall size of the machine housing is limited.

Although the use of the reflective mirrors brings about such an advantage that the machine housing can be reduced in size to some extent, it adversely leads to reduction in the intensity of light available for illumination of the original to be copied. In addition to the aforesaid reduction in the intensity of light, the use of the reflective mirrors with the lens assembly having a relatively low optical transmission factor, for example, about 0.2 in the case of a lens assembly having a fixed f/stop number of 5.6, requires the use of an illumination lamp of high electric wattage and the consequent employment of cooling and heat radiating arrangements for preventing the original or document to be copied from being spoiled, or otherwise burned, by the heat of elevated temperature which is generated by the illumination lamp.

Other disadvantages resulting from the use of the reflective mirrors are many; one of which is that, since dust floating in the air within the machine housing tends to adhere to some or all of the reflective surfaces of the mirrors, the quality of the image of the original subsequently reproduced on the recording medium tends to be lowered. Another one of these disadvantages is that, in order to support the lens assembly and the reflective mirrors in position within the machine housing and relative to each other, a dark light guide duct is required which is liable to produce internal reflection of light, that is, light bouncing, occurring inside the light guide duct and which is in turn liable to cause reduction of the contrast of the image of the original reproduced on the recording medium.

In order to shorten the length of the optical path of travel of rays of light carrying the image of the original to be copied and, at the same time, to make it possible to use an illumination lamp of relatively small electric wattage without lowering the optimum intensity of light available for exposure on a photoreceptor surface, the use of a fast lens assembly having a relatively short focal length with smaller f/stop number can be contemplated. However, it has been found that the employment of such a fast lens assembly is more or less limited by the following reasons:

a. The fast lens assembly involves a problem that although the quality of the image at the center can be high, the tendency is for performance at the edge to fall off and, therefore, difficulty has been encountered in avoiding reduction in quality of the image at the edge thereof so as to achieve maximum uniformity over the image area.

b. The fast lens assembly has the tendency to project less light to the corners than to the central image area and, accordingly, a relatively high intensity of light is required to compensate for reduction of the light passing the corners of the lens assembly relative to that passing the central portion of the same lens assembly or, where the copying machine employs a slit exposure system, a relatively large slit is required to compensate for the reduction.

One of the heretofore practised successful approaches to eliminate the above described optical disadvantages inherent in the conventional copying machine and concurrently to simplify the construction of the copying machine is the use of an image transmitter composed of optical fibers in a linearly bundled configuration, which optical fibers are sold under the tradename "SELFOC" and have a refractive index distribution in cross section thereof that varies consecutively and parabolically outwards from a center portion thereof, said refractive index distribution satisfying the equation of $n = N(1 - ar^2)$, wherein N is the refractive index at the center, n is the refractive index at a distance r from the center and a is a positive constant.

With particular reference to FIG. 1 of the accompanying drawings which shows an example of the image transmitter, the image transmitter 1 has superseded the lens assembly and its associated optical elements and comprises the optical fibers 2 referred to above, which optical fibers are arranged side by side in two rows and are in turn sheathed by a protective covering 3. This image transmitter 1 is positioned between a transparent support 4 for support of the original to be copied thereon and a photoreceptor surface 5 in such a manner that one end of said image transmitter 1 is spaced a distance $l_1$ from the original and a distance $l_1'$ from the undersurface of said transparent support 4 while the other end of said image transmitter is spaced a distance $l_2$ from said photoreceptor surface 5.

Since the height $t$ of the image transmitter 1 is about 31.5 mm. as has proven practically acceptable while the distances $l_1$, $l_1'$ and $l_2$ are respectively 3.3 mm., 1.7 mm. and 5.0 mm it is clear that the length of the optical path of travel of the image from the original towards the photoreceptor surface has been considerably reduced to, for example, 38.2 mm. as compared with 600 mm. in the conventional copying machine. Accordingly, with this particular image transmitter superseding the lens assembly and its associated optical elements such as a lens assembly and mirror arrangement, the copying machine can be manufactured in a relatively compact size. Moreover, the image transmitter is advantageous in that the maximum uniformity in image quality can be achieved over the substantially entire image area.

Furthermore, since the optical fibers of graded refractive index have a relatively high optical transmission factor, for example, four to ten times that of the lens element of 5.6 in f/stop number, the illumination device may employ an electric lamp of relatively low wattage. In addition, since no mirror arrangement is required in association with the image transmitter, no problem of avoiding optical aberrations and distortions, which may otherwise occur with the lens assembly and the mirror arrangement, is presented and the optical system of the copying machine can easily be assembled and adjusted.

However, in practice, the use of the image transmitter presents a problem peculiar to the image transmitter in view of the fact that, while the effective slit width, as indicated by w in FIG. 1, is very small, for example, 3.6 mm., the distance $l_1$ between the end of the image transmitter 1 and the undersurface of the transparent support 4 is also very small as hereinbefore described. In other words, because of the fact described above, any existing illumination systems employed in the commercially available copying machines cannot be effectively utilized in association with the image transmitter referred to above. This is because, where the illumination system employs the image transmitter now under discussion, rays of light available from the illumination system for illumination of a consecutive portion of the original to be copied and to be subsequently projected onto the photoreceptor surface should be available in the form of a strip or ribbon of light having a width corresponding to the slit width w of the image transmitter. The slit width w of the image transmitter can be increased by arranging the optical fibers of graded refractive index side by side in more than two rows. However this results in an increase of the manufacturing cost of and a complicated structure of the illuminating device.

Accordingly, an essential object of the present invention is to provide an improved illumination device for use in the copying machine having the optical system in the form of the particular image transmitter, which illumination device substantially eliminates the aforesaid disadvantages inherent in the conventional copying machine.

Another important object of the present invention is to provide an improved illumination device of the type referred to above, which comprises a substantially flattened light guide duct having one end situated adjacent the image transmitter and open towards the undersurface of the transparent support structure adapted to support thereon the original to be copied, said guide duct accommodating therein a source of illumination light held in position adjacent the other end thereof and spaced from said one end of said light guide duct a distance corresponding to the maximum width of the original to be copied, so that a consecutive portion of the original to be copied can uniformly be illuminated all over the entire width thereof.

A further object of the present invention is to provide an improved illumination device of the type referred to above, which can be manufactured in a relatively compact size and can readily be installed in a copying machine during manufacture of said copying machine.

In accomplishing these objects, according to the teachings of the present invention, the illumination device comprises a substantially flattened light guide duct supported in position within the copying machine in parallel relation to the undersurface of the transparent support structure. The light guide duct has a portion adjacent one end thereof situated adjacent the image transmitter and open towards the undersurface of the transparent support structure. An illumination light means, for example, a tubular electric lamp, is housed within the light guide duct and situated adjacent the other end of said light guide duct spaced from said one end thereof a distance corresponding to the maximum width of the original to be copied and, hence, the maximum width of the transparent support structure employed. For collecting a maximum amount of light available from the light means for illumination of the original to be copied, a portion adjacent the one end of the light guide duct and opposed to the opening in the light guide duct and the other end of the light guide duct are both concave. The concave shape of that portion of the light guide duct opposed to the opening facing the undersurface of the transparent support structure and the concave shape of the other end of the light guide duct have the shape of a curve represented by a quadratic equation.

These and other objects and features of the present invention will become apparent from the following description taken in conjunction with preferred embodiments thereof with reference to the accompanying drawings, in which.

Before the description of the present invention proceeds, it should be noted that like parts are designated by like reference numerals throughout the several views of the accompanying drawings.

Figure 6:
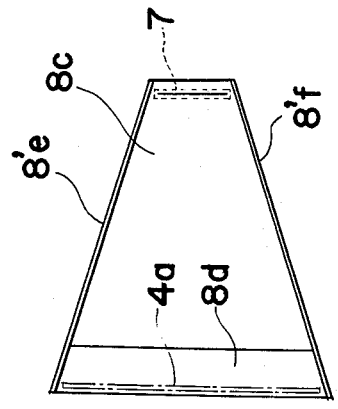
FIG. 6 is a top sectional view of the illumination device, showing a modified form of light guide duct according to a further embodiment of the present invention.

For the purpose of the presenst disclosure, the electrophotographic copying machine to which the present invention is applicable will now be described in terms of its function with particular reference to FIG. 2. This is because the arrangement of various mechanical operating elements of the copying machine is not a subject matter of the present invention.

The copying machine shown comprises a photoreceptor surface 5 including a photoconductive layer or light receiving layer on a conductive backing and formed in the shape of a drum, which is mounted on a shaft (not shown) journaled in a machine frame to rotate in the direction indicated by the arrow to cause the drum surface sequentially to pass a plurality of processing stations including charging, exposure or imaging, developing, transfer and cleaning stations.

The charging station includes a corona charger 21 which applies a uniform electrostatic charge on the photoreceptor surface 5. Positioned next and adjacent to the charging station with respect to the direction of rotation of the photoreceptor surface 5 is the exposure or imaging station at which a light or radiation pattern of the original to be copied, which has been transmitted from a reciprocally movably supported transparent support structure 4, on which the original to be copied is placed, through the image transmitter of the particular construction as hereinbefore described, is projected onto the photoreceptor surface 5 to dissipate the electrostatic charge in the exposed area thereof thereby forming a latent electrostatic image of the original to be copied.

The exposed area on the photoreceptor 5 is, as the latter is rotated, subsequently transferred to the developing station at which developing toner particles having an electrostatic charge opposite to that of the electrostatic latent image are applied, or otherwise cascaded in any known manner, over the photoreceptor surface by a developer 10, having a construction which will be described later, to form a powder image in the configuration corresponding to the electrostatic latent image. In the illustrated embodiment, the developer 10 comprises a rotatable hollow cylindrical drum 12 having built-in magnets (not shown) rigidly held within the hollow of the cylindrical drum, which drum forms magnetic brush bristles of the developing material, composed of a mixture of magnetizable carrier beads and toner particles, which are clipped off said drum 12 onto a cascading plate 13 and subsequently applied in contact with the electrostatic latent image to be developed. The developer 10 further comprises an impeller wheel 11 for, during rotation thereof, forcing the developing material to be attracted onto the cylindrical drum 12 and concurrently mixing the toner particles with the carrier beads which have been used and subsequently fed back to the bottom of a developer tank by means of a transport drum or sleeve 14.

Between the developing station and the transfer station, there is provided a paper feeding station including a sheet feeding mechanism adapted to feed sheets of recording medium, for example, paper, successively to the photoreceptor surface 5 in coordination with the presentation of the developed image at said paper feeding station. This sheet feeding mechanism comprises a sheet supply tray 26 accommodating therein a stack of sheets of paper 27 which are fed one at a time by a feed roll 27 into a feed passage defined by pairs of spaced guides 30 and 31. The sheet feed mechanism further comprises a pair of juxtaposed conveyor rolls 29 positioned between the pairs of guides 30 and 31 and adapted to be driven in association with the photoreceptor surface 5 so as to direct each sheet material into contact with the rotating photoreceptor surface 5 at a point immediately preceding the transfer station.

At the transfer station, there is provided a corona discharger 32 for effecting transfer of the developed image from the photoreceptor surface 5 to the sheet material in any known manner.

The sheet of paper, that has been transferred with the powder image from the photoreceptor surface 5 at the transfer station, is thereafter removed from the photoreceptor surface 5 by a pick-off mechanism 22 onto a conveyor belt 33 being driven. That portion 33a of the conveyor belt 34, which is moving in a direction away from the photoreceptor surface 5 towards a fixing station as will be described later, is backed up by a suction plate 33a communicating with a source of vacuum 35 for supporting the developed or reproduced sheet of paper flat against the conveyor belt surface during transportation thereof from the photoreceptor surface 5 towards the fixing station.

The fixing station includes a heat applying roll 38a positioned adjacent a heater 38 so as to be heated by said heater 38, and a back-up roll 37 positioned below said heat applying roll 38a. The heater 38 may comprise an electric infrared lamp 36 and it will readily be seen that, as the developed sheet of paper passes between the heat applying roll 38a and the back-up roll 37, the powder image on one surface of the sheet of paper can permanently be fixed in a known manner. The fixed sheet of paper is then picked off the rolls 38a and 37 by pick-off elements 39 and fed onto a pair of juxtaposed ejecting rolls 40 from which the same fixed sheet of paper is ejected outside the copying machine.

The photoreceptor surface 5, from which the developed and transferred sheet of paper has been separated at the pick-up station, is subsequently transferred during its continued rotation to the cleaning station past an erasing lamp 23 which removes the residual electrostatic charge on the photoreceptor surface 5.

The cleaning station includes a cleaning unit 15 which comprises a take-up roll 20 and a rotatably supported roll of cleaning paper 17 from which a web of cleaning paper extends towards said take-up roll 20 around a biasing roll 18 and an intermediate roll 19. The biasing roll 18 forces the web of cleaning paper 16 from the roll 17 to contact the photoreceptor surface 5 for, during continued rotation of the photoreceptor surface 5, cleaning the residual toner particles off the photoreceptor surface 5 in readiness for the subsequent cycle of copying operation.

Preferably, the developer 10, the cleaning unit 15, the corona charger 21, the pick-off mechanism 22 and the eraser lamp 23 are housed in position within a casing 24 which is in turn housed within the machine housing structure for removal from and insertion into said housing structure by means of any suitable guide rail arrangement (not shown).

The illumination device according to the present invention is generally indicated by 6 and is substantially positioned above the cleaning unit 15 and immediately below the reciprocally movably supported transparent support structure 4 which may be made of a transparent glass plate. The details of the illumination device 6 are best shown in FIGS. 3 and 4 and, therefore, reference will now be made thereto.

Figure 2:
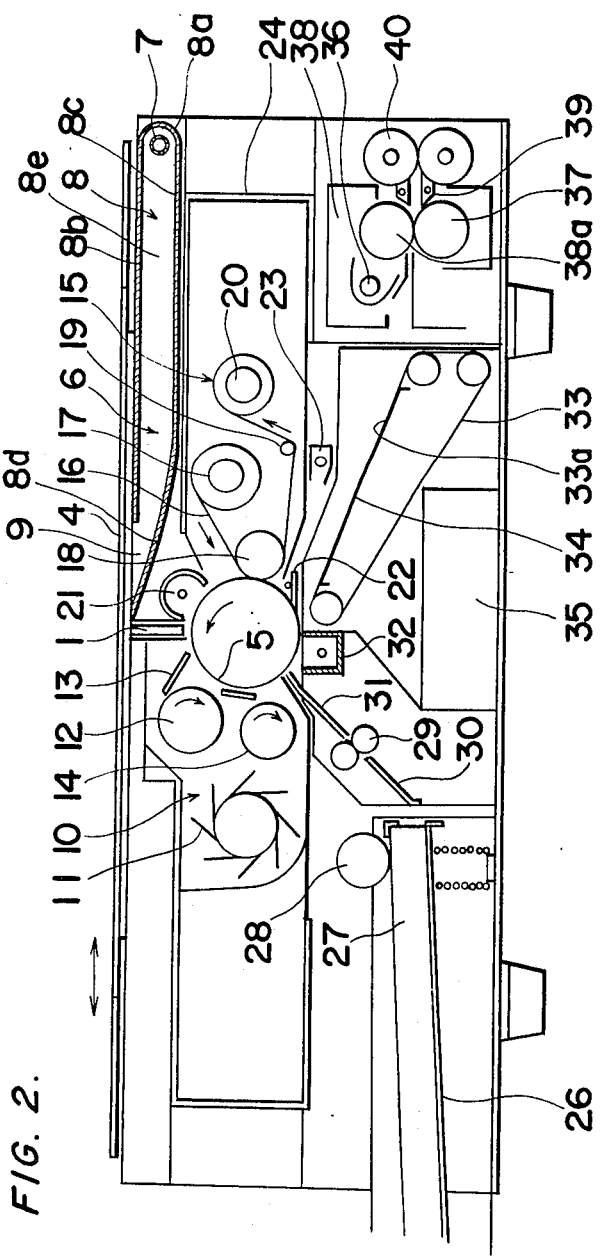
FIG. 2 is a schematic side sectional view of a electrophotographic copying machine employing an illumination device according to the present invention.
Figure 3:
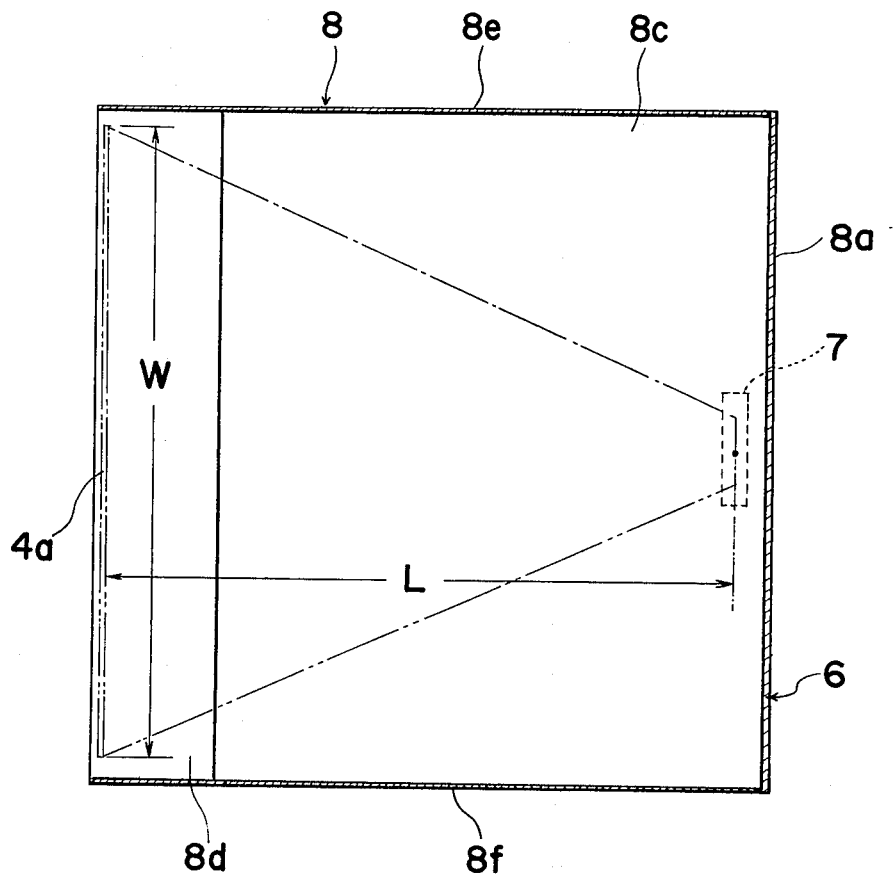
FIG. 3 is a top sectional view, on an enlarged scale, of the illumination device shown in FIG. 2.
Figure 4:
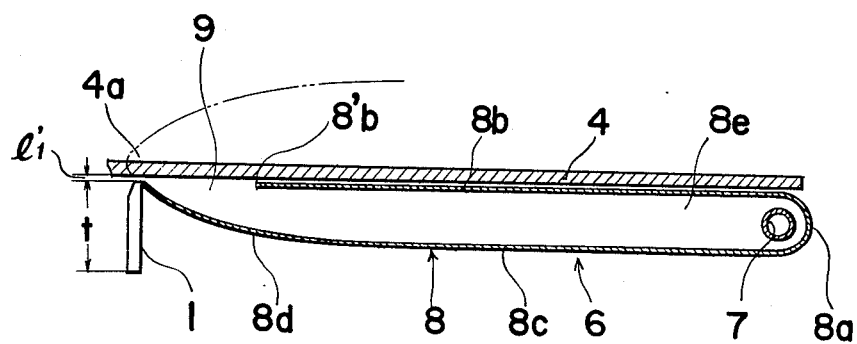
FIG. 4 is a side sectional view, on an enlarged scale, of the illumination device shown in FIG. 2.

Referring now to FIGS. 3 and 4, the illumination device 6 comprises a light guide duct 8 in the shape of a hollow substantially flattened cubic body and an illumination light means in the form of an elongated electric lamp 7 housed within said guide duct 8. The light guide duct 8 comprises an end wall 8a, top and bottom walls 8b and 8c and a pair of opposed side walls 8e and 8f, all joined together to provide the substantially flattened cubic body as can readily be seen from FIGS. 2 to 4. As best shown in FIG. 4, one of the opposed ends of the bottom wall 8c which is remote from the end wall 8a terminates adjacent one of the opposed ends, that is, the top end, of the image transmitter 1 which is close to the undersurface of the transparent support structure 4, and also terminates at or in the vicinity of the level of the plane of the top wall 8b. For this purpose, a portion of the bottom wall 8c adjacent said one of said opposed ends thereof is upwardly curved as indicated at 8d to provide a concave reflective surface, the contour of which concave reflective surface 8d occupies a portion of the curve $\alpha$ of secondary degree, that is, a curve represented by a quadratic equation, such as a parabola or an ellipse, having the focus at a point 4a on the upper surface of the transparent support structure 4 and substantially immediately above the image transmitter 1. It is to be noted that, since the cross-sectional representation of the light guide duct 8 in FIG. 4 is taken along a plane parallel to the side walls 8e and 8f, the focus 4a shown as a point in FIG. 4 appears in practice in the form of a line focus. It is further to be noted that determination of the position of the line focus 4a requires for the particular refractive index of the transparent support structure 4 to be taken into consideration.

The top wall 8b extends in parallel relation to and also in spaced relation to the bottom wall 8c and has a length less than that of the bottom wall 8c so that a light exit 9 can be formed in the shape of a strip between the tip 8'b of the top wall 8b and the corresponding tip of the wall portion 8d.

The end wall 8a in the embodiment shown in FIG. 4 has a right semi-circular cross section. By the terms "right semi-circular cross section," is meant that the curvature of the end wall 8a is represented by one of the halves of the geometric right cylinder divided by the plane passing through the center axis of said.

The elongated electric lamp 7, or otherwise a light bulb, is accommodated within the light guide duct 8 and extends widthwise parallel to the end wall 8a. The electric lamp 7 is held in position in alignment with the center of curvature of the end wall 8a and spaced from the plane passing through the line focus 4a at right angles to the transparent support structure 4 a distance L corresponding to the maximum width W of the original to be copied and, hence, the transparent support structure 4. The lamp 7 is also held in position intermediate of the width of the light guide duct 8.

The side walls 8e and 8f in the embodiment shown in FIGS. 2 to 4 extend in parallel, spaced relation to each other. However, these side walls may, as indicated by 8'e and 8'f in FIG. 6, extend in a direction converging towards the lamp 7.

Although not shown, the respective interior surfaces of the walls 8a, 8b, 8c, 8d, 8e and 8f are in practice made reflective by plating, or otherwise electro-depositing, a foil of substantially pure aluminum. Preferably, these walls 8a to 8f are made of metallic material having a relatively high heat conductivity, such as aluminum or aluminum alloy, in which cases at least the interior surfaces of these walls 8a to 8f should be polished, for example, by means of an electrolytic polishing technique. The use of susbstantially pure aluminum is preferred as a material for the walls 8a to 8f. Particularly, the curved wall 8d may be made of a molded synthetic resin and be subsequently vapor-bonded on the interior surface thereof with a foil of aluminum of relatively high purity.

A similar description presented above shall equally applicable to the embodiment shown in FIG. 6.

In the construction so far described, rays of light emitted from the lamp 7 travel towards the curved wall 8d. At this time, some of the light rays travel directly towards the curved walls 8a, some after having alternately been reflected by the walls 8b and 8c and some after having reflected by the end wall 8a and subsequently by the walls 8b and 8c. Moreover, some of the light rays from the lamp 7, which are laterally diffused towards the opposed side walls 8e and 8f or 8'e and 8'f, are also directed towards the curved wall after having been reflected by the side walls 8e and 8f or 8'e and 8'f.

Most of the light rays, which have been projected onto the curved wall 8d from the lamp 7 in the manner as hereinbefore described, are reflected towards the transparent support structure 4, converging towards the line focus 4a thereby to form a strip or ribbon of light available for illumination of a consecutive portion of the original to be copied, which is placed on the transparent support structure 4. Accordingly, it is clear that substantially the entire amount of light emitted from the lamp 7 can effectively be utilized to illuminate the consecutive portion of the original to be copied and, therefore, the lamp 7 does not require a relatively high wattage. It is to be noted that the strip or ribbon of light extends uniformly all over the entire width of the transparent support structure 4 with no substantial variation in the intensity of light.

Moreover, the space between the top and bottom walls 8b and 8c or the diameter of the imaginary circle occupied by the contour of the end wall 8a is smaller than the height $t$ of the image transmitter and, accordingly, the guide duct 8 of the above construction is compact in size and does not require a relatively large space for installation thereof within the machine housing structure.

It is to be noted that some of the light rays from the lamp 7, which impinge the consecutive portion of the original to be copied at an angle of incidence of not less than 80°, are undesirable for illumination purpose in the sense that the contrast of the image appearing on the consecutive portion of the original to be copied is more or less reduced. This can be eliminated by appropriately positioning, or otherwise selecting the position of, the tip 8'b of the top wall 8b so that a portion of the top wall 8b adjacent the tip 8'b can effectively shield the unnecessary rays of light which impinge at the original at the angle of incidence of not less than 80°.

According to the experiment conducted by the use of the illumination device 6 of the construction shown in FIGS. 3 and 4 and having the following particulars, the photoreceptor surface was illuminated at 500 luxes at a central portion, 490 luxes at a left-hand portion and 480 luxes at a right-hand portion thereof in the case of a white original.

The particulars of the illumination device 6 are as follows:

Lamp 7: Halogen gas filled lamp having a filament length of 30 mm. and a colour temperature of 3,100 °K.
Wattage: 200
Distance L: 270 mm.
Reflective surfaces 8a to 8f: Have deposited thereon a foil of 99.99% aluminum by means of the electrolytic depositing technique.
Diameter of End Wall 8a: 28 mm
Distance $l_1$: 5 mm.
Height 1 of Transmitter 1: 31.5 mm.
Effective Slit Width $w$ of Transmitter 1: 3.6 mm.

In order to obtain same amount of exposure on the photoreceptor surface in the conventional illumination device and optical system having an exposure slit 10 mm. in width and employing a lens element (in the form of a mirror lens) of 5.6 in f/stop number and three reflective mirrors, and an illumination lamp in the form of a halogen gas filled lamp of 500 watts has been required.

From the foregoing comparision, it is clear that the optical system using the illumination device according to the present invention exhibits a high illumination performance about 2.5 times that of the conventional optical system with considerable, advantageous reduction in the required wattage of the illumination lamp.

Figure 5:
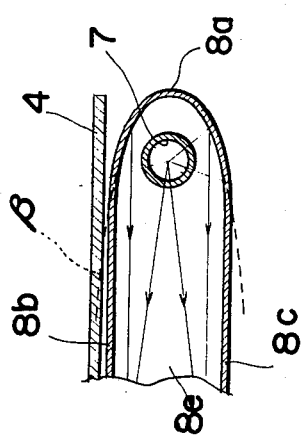
FIG. 5 is a side sectional view, on a further enlarged scale, of a portion of the illumination device, showing another embodiment of the present invention.
Figure 1:
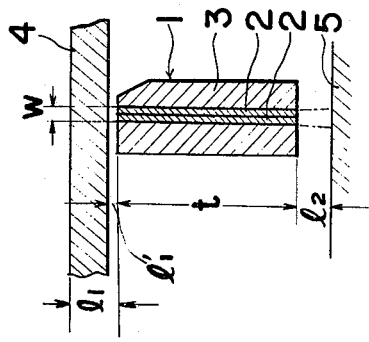
FIG. 1 is a schematic side sectional view of the prior art image transmitter forming a part of an optical system of the copying machine, which drawing has already been referred to in the foregoing description.

Referring now to FIG. 5, which shows a modification of the end wall 8a, the end wall 8a may have a parabolic cross-sectional shape. This parabolic cross-sectional shape occupies a portion of the imaginary curve β represented by a quadratic equation which is symmetrical with respect to the plane passing through the line focus of the parabolic shape in parallel relation to the transparent support structure 4. In the embodiment of FIG. 5, the lamp 7 should be held in position in alignment with the line focus of the parabolic shape represented by the end wall 8a so that rays of light, which are emitted from the lamp 7 towards the parabolic end wall 8a, travel in parallel relation to each other towards the curved wall 8d after having been reflected by the parabolic wall 8a. Even this arrangement of FIG. 5 exhibits a performance similar to that shown in FIGS. 2 to 4.

Although the present invention has been fully described by way of the preferred embodiments thereof, it should be noted that various changes and modifications will be apparent to those skilled in the art. By way of example, the cross sectional shape of the curved wall 8d may occupy a portion of the right elliptical cylinder having two line foci, in which case one of the line foci of said right elliptical cylinder should be located at the point 4a. In addition, the end wall 8a may have a cross sectional shape occupying another portion of the right elliptical cylinder of which the other of said line foci is occupied by the light source 7.

Accordingly, such changes and modifications, unless they depart from the true scope of the present invention, should be understood as included therein.

What is claimed is:

1. An optical illumination device for use in a copying apparatus of the type wherein an object is to be illuminated and an image thereof is to be projected through a particular image transmitter formed of a plurality of optical fibers of graded refractive index in bundled configuration to a light sensitive surface, said device comprising: an illumination light means; and a light guide duct having the shape of a substantially flattened cubic body supported within the machine housing below a transparent support structure for the support of the object thereon, said light guide duct comprising top and bottom reflective surfaces in spaced relation to each other, a pair of opposed side reflective surfaces extending between said top and bottom reflective surfaces in spaced relation to each other, and an end reflective surface at one end of said light guide duct closing the end thereof, said bottom reflective surface being greater in length than said top reflective surface and having a portion thereof adjacent the other end of said light guide duct upwardly curved, said upwardly curved portion of said bottom reflective surface terminating adjacent the light receiving area of the image transmitter and providing a light exit in cooperation with the free end of said top reflective surface, said light means being accommodated within said light guide duct and held in position adjacent said end reflective surface, rays of light from said light means to travel towards said curved portion of said bottom reflective surface and, after having been reflected by said curved portion of said bottom reflective surface, further travel towards the object through said light exit.

2. An optical illumination device as claimed in claim 1, wherein said curved portion of the bottom reflective surface has a cross sectional shape occupying a portion of the imaginary curve represented by a quadratic equation, which imaginary curve has a line focus situated on the transparent support structure and substantially immediately above the light receiving area of the image transmitter.

3. An optical illumination device as claimed in claim 2, wherein said imaginary curve is a parabolic curve.

4. An optical illumination device as claimed in claim 1, wherein said top and bottom reflective surfaces extend in parallel relation to each other.

5. An optical illumination device as claimed in claim 4, wherein said top and bottom reflective surfaces are spaced from each other a distance smaller than the height of the image transmitter employed.

6. An optical illumination device as claimed in claim 1, wherein said side reflective surfaces extend in parallel relation to each other.

7. An optical illumination device as claimed in claim 1, wherein said side reflective surfaces extend in a substantially converging direction towards the light means.

8. An optical illumination device as claimed in claim 3, wherein said end reflective surface has a cross sectional shape occupying a poriton of the imaginary curve represented by a quadratic equation.

9. An optical illumination device as claimed in claim 8, wherein said imaginary curve is a parabolic curve and wherein said light means is situated in alignment with the only line focus of said parabolic curve of said end reflective surface.

10. An optical illumination device as claimed in claim 1, wherein all of said reflective surfaces are made of high heat-conductive material.

11. An optical illumination device as claimed in claim 1, wherein said end reflective surface has a cross sectional shape representing a right semi-circle, the center of curvature of said right semi-circle being occupied by said light means.

12. An optical illumination device as claimed in claim 1, wherein said curved portion of said bottom reflective surface has a cross sectional shape occupying a portion of the imaginary hollow cylinder having one of line foci situated on the transparent support structure and substantially immediately above the light receiving area of the image transmitter.

13. An optical illumination device as claimed in claim 12, wherein said end reflective surface has a cross sectional shape occupying another portion of said hollow cylinder, the other of said line foci being occupied by said light means.

14. An optical illumination device as claimed in claim 3, wherein said end reflective surface has a cross-sectional shape occupying a portion of the imaginary curve represented by a quadratic equation.

15. An optical illumination device as claimed in claim 14, wherein said imaginary curve is a parabolic curve and wherein said light means occupies the position of a line focus of the parabolic curve of said end reflective surface.

16. An optical illumination device for use in a copying apparatus of the type wherein an object is to be illuminated and an image thereof is to be projected through a particular image transmitter formed of a plurality of optical fibers of graded refractive index in bundled configuration to a light sensitive surface, said device comprising:

an illumination light means; and an light guide duct of substantially flattened cubic body supported within the machine housing below a transparent support structure for the support of the object thereon, said light guide duct comprising top and bottom reflective surfaces in spaced and parallel relation, a pair of opposed side reflective surfaces extending between said top and bottom surfaces in spaced relation to each other, and an end reflective surface at one end of said light guide duct closing the end thereof, said bottom reflective surface being greater in length than said top reflective surface and having a portion thereof adjacent the other end of said light guide duct upwardly curved to form a substantially parabolic cross-sectional shape, said parabolic sectioned portion of said bottom reflective surface terminating adjacent the light receiving area of the image transmitter and providing a light exit in cooperation with the free end of said top reflective surface, said light means being accommodated within said light guide duct and held in position adjacent said end reflective surface, rays of light from said light means adapted to travel towards said parabolic sectioned portion of said bottom reflective surface and, after having been reflected by said parabolic sectioned portion of the bottom reflective surface, further travel towards the object through said light exit, the parabolic cross-sectional shape of said portion of said bottom reflective surface having a line foci situated on the transparent support structure and substantially immediately above the light receiving area of the image transmitter.

17. An optical illumination device as claimed in claim 16, wherein said end reflective surface has a semi-circular cross sectional shape and wherein said light means is held in position occupying the center of curvature of said semi-circular cross sectional shape of said end reflective surface.

18. An optical illumination device as claimed in claim 16, wherein said end reflective surface has a cross sectional shape occupying a portion of the imaginary parabolic curve and wherein said light means is held in position to occupy the position of a line focus of said parabolic curve of said end reflective surface.

19. An optical illumination device as claimed in claim 16, wherein said side reflective surfaces extend in parallel relation to each other.

20. An optical illumination device as claimed in claim 17, wherein said side reflective surfaces extend in parallel relation to each other.

21. An optical illumination device as claimed in claim 18, wherein said side reflective surfaces extend in parallel relation to each other.

22. An optical illumination device as claimed in claim 16, wherein said side reflective surfaces extend in a substantially converging direction towards the light means.

23. An optical illumination device as claimed in claim 17, wherein said side reflective surfaces extend in a substantially converging direction towards the light means.

24. An optical illumination device as claimed in claim 18, wherein said side reflective surfaces extend in a substantially converging direction towards the light means.

25. An optical illumination device as claimed in claim 2, wherein said imaginary curve is an elliptical curve.

* * * * *